US009802641B2

(12) United States Patent
Tomikawa

(10) Patent No.: US 9,802,641 B2
(45) Date of Patent: Oct. 31, 2017

(54) STEERING SYSTEM

(71) Applicant: JTEKT CORPORATION, Osaka-shi, Osaka (JP)

(72) Inventor: Takashi Tomikawa, Nisshin (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/373,196

(22) Filed: Dec. 8, 2016

(65) Prior Publication Data

US 2017/0174254 A1 Jun. 22, 2017

(30) Foreign Application Priority Data

Dec. 17, 2015 (JP) ................................ 2015-246568

(51) Int. Cl.
*B62D 5/04* (2006.01)
*B62D 3/08* (2006.01)
*B62D 5/00* (2006.01)
*F16H 7/12* (2006.01)
*F16H 7/02* (2006.01)
*F16H 7/08* (2006.01)

(52) U.S. Cl.
CPC ............ *B62D 5/0448* (2013.01); *B62D 3/08* (2013.01); *B62D 5/008* (2013.01); *B62D 5/0424* (2013.01); *F16H 7/02* (2013.01); *F16H 7/1281* (2013.01); *F16H 2007/0842* (2013.01); *F16H 2007/0865* (2013.01); *F16H 2007/0893* (2013.01)

(58) Field of Classification Search
CPC .. B62D 5/0403; B62D 5/0412; B62D 5/0445; B62D 5/0448; F16H 7/02; F16H 7/1281; F16H 2007/0842; F16H 2007/0865; F16H 2007/0893

USPC ............... 180/443, 444; 74/388 PS; 474/112
See application file for complete search history.

(56) References Cited

U.S. PATENT DOCUMENTS

| 2,347,900 | A | * | 5/1944 | Fazer-Nash | ............... F16H 7/02 474/112 |
| 4,610,645 | A | * | 9/1986 | Donn | .................... F16H 7/1281 474/112 |
| 4,621,701 | A | * | 11/1986 | Takabayashi | ............ B62D 6/10 180/444 |
| 6,227,064 | B1 | * | 5/2001 | Nakamura | ........... B62D 5/0445 180/443 |

(Continued)

FOREIGN PATENT DOCUMENTS

JP 2007-112245 A 5/2007

*Primary Examiner* — Anne Marie Boehler
(74) *Attorney, Agent, or Firm* — Oliff PLC

(57) ABSTRACT

A rack housing includes first and second rack housing members aligned in the axial direction of the rack shaft and coupled to each other in the vicinity of a speed reducer. A speed reducer casing is provided in its outer wall with a through hole. A belt tension adjusting mechanism includes: an adjusting shaft rotatably attached to the speed reducer casing; an eccentric shaft attached to the outer periphery of the adjusting shaft so as to be rotatable together with the adjusting shaft; two bearings disposed on the outer periphery of the eccentric shaft and axially away from each other; and a tension pulley rotatably attached to the outer periphery of the eccentric shaft via the bearings. A first end of the adjusting shaft is exposed to the outside of the speed reducer casing through the through hole.

7 Claims, 4 Drawing Sheets

(56) References Cited

U.S. PATENT DOCUMENTS

| | | | | |
|---|---|---|---|---|
| 6,960,145 B2* | 11/2005 | Fraley, Jr. | ............ | B62D 5/0424 |
| | | | | 180/444 |
| 7,191,866 B2* | 3/2007 | Sasaki | ................. | B62D 5/0424 |
| | | | | 180/443 |
| 7,278,334 B2* | 10/2007 | Saruwatari | ........... | B62D 5/0412 |
| | | | | 180/444 |
| 7,510,045 B2* | 3/2009 | Bareis | ................. | B62D 5/0424 |
| | | | | 180/443 |
| 9,239,097 B2* | 1/2016 | Lescorail | ................. | F16H 7/12 |
| 2005/0121251 A1* | 6/2005 | Ueno | ................... | B62D 5/0409 |
| | | | | 180/444 |
| 2005/0133297 A1* | 6/2005 | Chikaraishi | .......... | B62D 5/0424 |
| | | | | 180/444 |
| 2017/0029017 A1* | 2/2017 | Pattok | ..................... | B60T 7/042 |

\* cited by examiner

STEERING SYSTEM

INCORPORATION BY REFERENCE

The disclosure of Japanese Patent Application No. 2015-246568 filed on Dec. 17, 2015 including the specification, drawings and abstract is incorporated herein by reference in its entirety.

BACKGROUND OF THE INVENTION

1. Field of the Invention

The invention relates to steering systems.

2. Description of the Related Art

A steering system known in the related art transmits rotational motion of a motor to a ball screw mechanism through a toothed belt and pulleys so as to convert the rotational motion of the motor into linear motion of a rack shaft, thus assisting a driver in performing a steering operation. If the tension of the belt is reduced (or the belt is loosened), an increase in torque transmitted between the belt and the pulleys may cause the teeth of the belt to move out of engagement with the teeth of the pulleys, making it impossible to transmit the torque increased. To solve this problem, the steering system is provided with a belt tension adjusting mechanism to adjust the tension of the belt. The rack shaft, the ball screw mechanism, a speed reducer including the belt and pulleys, and the belt tension adjusting mechanism are housed in a rack housing of the steering system. The rack housing is made up of a combination of first and second rack housing members aligned axially.

A belt tension adjusting mechanism disclosed in Japanese Patent Application Publication No. 2007-112245 (JP 2007-112245A) includes: a base swingably supported on a rack housing via a pin; a tension pulley rotatably supported on the base and configured to come into contact with a belt; and a feed screw mechanism to press the base so that the tension pulley is pressed against the belt. Adjusting the feed of the feed screw mechanism controls the degree of pressing of the tension pulley against the belt.

Suppose that this belt tension adjusting mechanism is to be housed in the rack housing of the steering system known in the related art. In this case, the procedure for assembling the rack housing inevitably involves: assembling the motor, the speed reducer, and the belt tension adjusting mechanism to, for example, the first rack housing member in advance; adjusting the tension of the belt by the belt tension adjusting mechanism; and then assembling the first rack housing member and the second rack housing member to each other. This is because the tension of the belt cannot be adjusted after the belt tension adjusting mechanism is housed in the rack housing by assembling the first rack housing member and the second rack housing member to each other. Such a procedure makes it necessary to attach the motor to the first rack housing member, thus restricting the location of the motor. This means that the procedure for assembling the rack housing is fixed.

SUMMARY OF THE INVENTION

An object of the invention is to provide a steering system that allows a high degree of flexibility in placing a motor.

A steering system according to an aspect of the invention includes a motor, a steered shaft, a ball screw mechanism, a speed reducer, a belt tension adjusting mechanism, and a housing. The steered shaft includes a thread groove. The steered shaft is configured to reciprocate in an axial direction of the steered shaft. The ball screw mechanism includes a cylindrical nut screwed to the thread groove via a plurality of balls. The ball screw mechanism is configured to provide an axial force to the steered shaft in accordance with rotation of the nut. The speed reducer includes a driven pulley fixed to an outer peripheral surface of the nut disposed inward of the driven pulley, a driving pulley fixed to a rotary shaft of the motor so as to be rotatable together with the rotary shaft, and a belt wound around the driven pulley and the driving pulley. The belt tension adjusting mechanism is configured to adjust a tension of the belt. The housing houses the steered shaft, the ball screw mechanism, the speed reducer, and the belt tension adjusting mechanism. The housing includes a first housing member and a second housing member aligned in the axial direction. Portions of the first and second housing members mating with each other and protruding in a direction perpendicular to the axial direction constitute a speed reducer casing which houses a portion of the speed reducer. The speed reducer casing is provided in its outer wall with a through hole passing through the outer wall in the axial direction. The belt tension adjusting mechanism includes a tension adjustment shaft, and a tension pulley rotatably disposed around an outer peripheral surface of the tension adjustment shaft. The tension pulley is configured to abut against the belt. The tension adjustment shaft includes a first end, a second end, and an eccentric cylindrical portion. The first end protrudes out of the housing through the through hole. The second end is housed in the housing. The second end is coaxial with the first end. The eccentric cylindrical portion is eccentric relative to a central axis of the first and second ends. The eccentric cylindrical portion is disposed between the first and second ends. The tension adjustment shaft is configured to rotate around the central axis of the first and second ends.

In this aspect, the first housing member and the second housing member may be assembled to each other before or after adjusting the tension of the belt by the belt tension adjusting mechanism. Thus, the motor may be attached to either one of the first housing member and the second housing member. This means that this aspect increases the flexibility of location of the motor. If the first housing member and the second housing member are already assembled to each other, rotating the tension adjustment shaft will enable adjustment of the tension of the belt.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
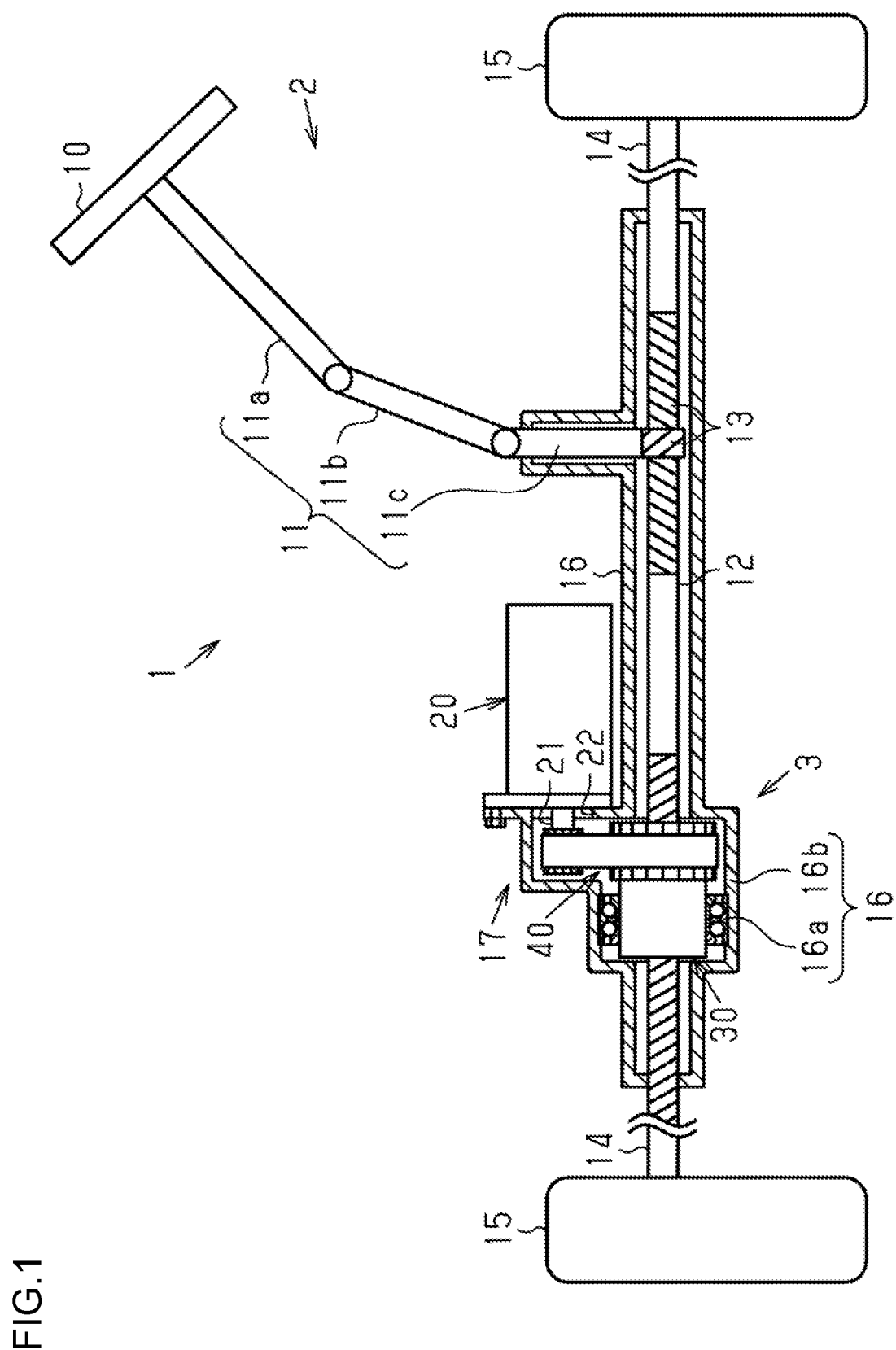
FIG. 1 is a diagram schematically illustrating a configuration of a steering system according to an embodiment of the invention.

A steering system according to an embodiment of the invention will be described below. The steering system according to this embodiment is an electric power steering system 1 (hereinafter referred to as an "EPS 1"). As illustrated in FIG. 1, the EPS 1 includes: a steering mechanism 2 to steer steered wheels 15 in accordance with rotation of a steering wheel 10 by a driver; and an assisting mechanism 3 to assist the driver in performing a steering operation.

The steering mechanism 2 includes the steering wheel 10, and a steering shaft 11 that rotates together with the steering wheel 10. The steering shaft 11 includes: a column shaft 11a coupled to the steering wheel 10; an intermediate shaft 11b coupled to the lower end of the column shaft 11a; and a pinion shaft 11c coupled to the lower end of the intermediate shaft 11b. The lower end of the pinion shaft 11c is combined with a rack shaft 12 so as to provide a rack-and-pinion mechanism 13. The lower end of the pinion shaft 11c is in engagement with the rack shaft 12. More specifically, the pinion teeth on the pinion shaft 11e are in engagement with the rack teeth on the rack shaft 12. The rack-and-pinion mechanism 13 includes: the pinion teeth on the end of the pinion shaft 11c; and the rack teeth on the rack shaft 12. Thus, the rack-and-pinion mechanism 13 converts rotational motion of the steering shaft 11 into reciprocating linear motion of the rack shaft 12 in the axial direction thereof (i.e., the right-left direction in FIG. 1). The reciprocating linear motion is transmitted to the right and left steered wheels 15 through tie rods 14 each coupled to an associated one of the ends of the rack shaft 12. This results in a change in the steered angle of each steered wheel 15.

The assisting mechanism 3 is provided around the rack shaft 12. The assisting mechanism 3 includes: a motor 20 serving as an assisting force generating source; a ball screw mechanism 30 attached integrally to the periphery of the rack shaft 12; and a speed reducer 40 to transmit the rotational force of a rotary shaft 21 of the motor 20 to the ball screw mechanism 30. The assisting mechanism 3 converts the rotational force of the rotary shaft 21 of the motor 20 into axial reciprocating linear motion of the rack shaft 12 through the speed reducer 40 and the ball screw mechanism 30. Thus, the assisting mechanism 3 assists the driver in performing a steering operation.

The ball screw mechanism 30, the speed reducer 40, the pinion shaft 11c, and the rack shaft 12 are covered with a rack housing 16. The rack housing 16 includes a first rack housing member 16a and a second rack housing member 16b aligned in the axial direction of the rack shaft 12 and coupled to each other in the vicinity of the speed reducer 40. The rack housing 16 is provided with a speed reducer casing 17 housing a portion of the speed reducer 40. The ends of the first and second rack housing members 16a and 16b where the first and second rack housing members 16a and 16b are coupled to each other each protrude in a direction intersecting the direction of extension of the rack shaft 12 (i.e., in an upward direction in FIG. 1). The protruding ends of the first and second rack housing members 16a and 16b are combined with each other in the axial direction, thus providing the speed reducer casing 17.

Figure 2:
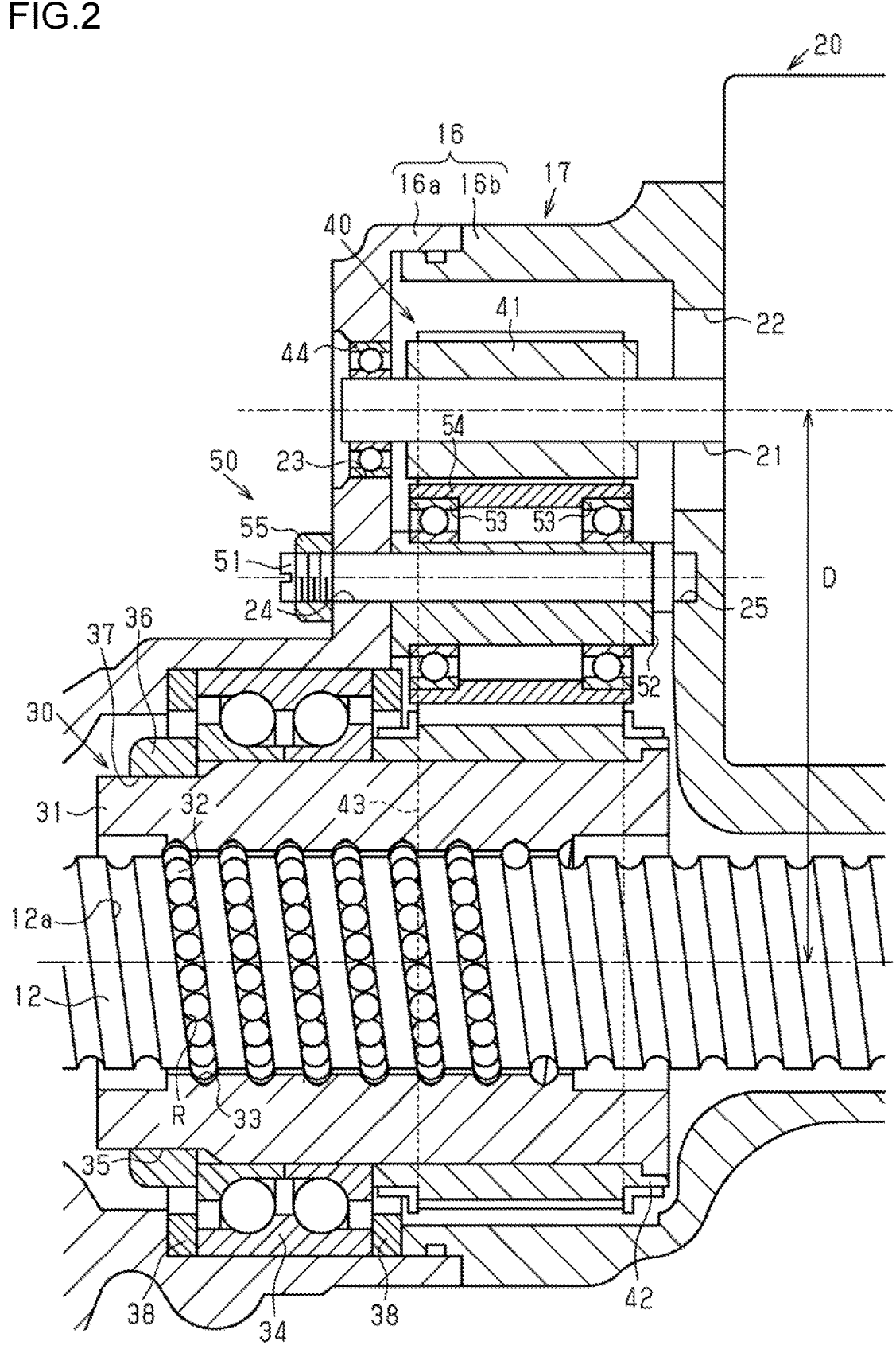
FIG. 2 is a cross-sectional view schematically illustrating a structure of an assisting mechanism included in the steering system according to this embodiment.

As illustrated in FIG. 2, a first outer wall of the speed reducer casing 17 (i.e., the right wall of the speed reducer casing 17 in FIG. 2) is provided with a through hole 22. The rotary shaft 21 of the motor 20 extends into the inner space of the speed reducer casing 17 through the through hole 22. The rotary shaft 21 is parallel to the rack shaft 12. A second outer wall of the speed reducer casing 17 (i.e., the left wall of the speed reducer casing 17 in FIG. 2) is provided with a through hole 23 located opposite to the through hole 22 in the axial direction. An extremity of the rotary shaft 21 (or more specifically, the left end of the rotary shaft 21 in FIG. 2) is rotatably supported in the through hole 23 via a bearing 44. The second outer wall of the speed reducer casing 17 (i.e., the left wall of the speed reducer casing 17 in FIG. 2) is further provided with a through hole 24. The first outer wall of the speed reducer casing 17 (i.e., the right wall of the speed reducer casing 17 in FIG. 2) is further provided with a fitting hole 25 located opposite to the through hole 24 in the axial direction.

The assisting mechanism 3 will be described below in more detail. As illustrated in FIG. 2, the ball screw mechanism 30 includes a cylindrical nut 31 screwed to the rack shaft 12 via a plurality of balls 32. The nut 31 is rotatably supported on the inner peripheral surface of the rack housing 16 via a cylindrical bearing 34. The rack shaft 12 is provided on its outer peripheral surface with a spiral thread groove 12a. The nut 31 is provided on its inner peripheral surface with a spiral thread groove 33 associated with the thread groove 12a of the rack shaft 12. A spiral space defined by the thread groove 33 of the nut 31 and the thread groove 12a of the rack shaft 12 functions as a rolling path R along which the balls 32 roll. Although not illustrated, the nut 31 is further provided with a circulation path providing a shortcut between openings at two locations along the rolling path R. Thus, the balls 32 are allowed to circulate endlessly along the rolling path R through the circulation path in the nut 31. A lubricant, e.g., grease, is applied to the rolling path R so as to reduce, for example, frictional resistance generated during rolling of the balls 32. A first end of the nut 31 (i.e., the left end of the nut 31 in FIG. 2) is provided on its outer peripheral surface with a thread groove 35.

The speed reducer 40 includes: a driving pulley 41 attached integrally to the rotary shaft 21 of the motor 20; a driven pulley 42 attached integrally to the outer periphery of the nut 31; and a belt 43 wound around the driving pulley 41 and the driven pulley 42. The driven pulley 42 is attached to the outer peripheral surface of a second end of the nut 31 (i.e., the right end of the nut 31 in FIG. 2). The rotary shaft 21 of the motor 20, the driving pulley 41 attached to the rotary shaft 21, and a portion of the belt 43 are disposed in the inner space of the speed reducer casing 17. A rubber toothed belt including a core, for example, is used as the belt 43. An inner ring of the bearing 34 is disposed on the outer peripheral surface of the nut 31. The inner ring of the bearing 34 is sandwiched between the driven pulley 42 and a lock nut 36 disposed on the first end of the nut 31. Thus, the inner ring of the bearing 34 is secured between the driven pulley 42 and the lock nut 36. The lock nut 36 is provided on its inner peripheral surface with a thread groove 37 screwed to the thread groove 35. An outer ring of the bearing 34 is sandwiched between the first rack housing member 16a and the second rack housing member 16b via fixing members 38 disposed on both sides of the outer ring in the axial direction.

Rotation of the rotary shaft 21 of the motor 20 causes the driving pulley 41 to rotate together with the rotary shaft 21. The rotation of the driving pulley 41 is transmitted to the driven pulley 42 through the belt 43. This causes the driven pulley 42 to rotate together with the nut 31. The nut 31 rotates with respect to the rack shaft 12. Thus, endless circulation of the balls 32 interposed between the nut 31 and the rack shaft 12 converts a torque applied to the nut 31 into an axial force to be applied to the rack shaft 12. This axial force moves the rack shaft 12 axially relative to the nut 31. The axial force applied to the rack shaft 12 acts as an assisting force that assists the driver in performing a steering operation. The speed reducer casing 17 is provided internally with a belt tension adjusting mechanism 50 to apply tension to the belt 43.

The belt tension adjusting mechanism 50 will be described in detail below. As illustrated in FIG. 2, the belt tension adjusting mechanism 50 includes: an adjusting shaft 51 rotatably attached to the speed reducer casing 17; an eccentric shaft 52 attached to the outer periphery of the adjusting shaft 51 so as to be rotatable together with the adjusting shaft 51; two bearings 53 disposed on the outer periphery of the eccentric shaft 52 and axially away from each other; and a tension pulley 54 rotatably attached to the outer periphery of the eccentric shaft 52 via the bearings 53.

Figure 3:
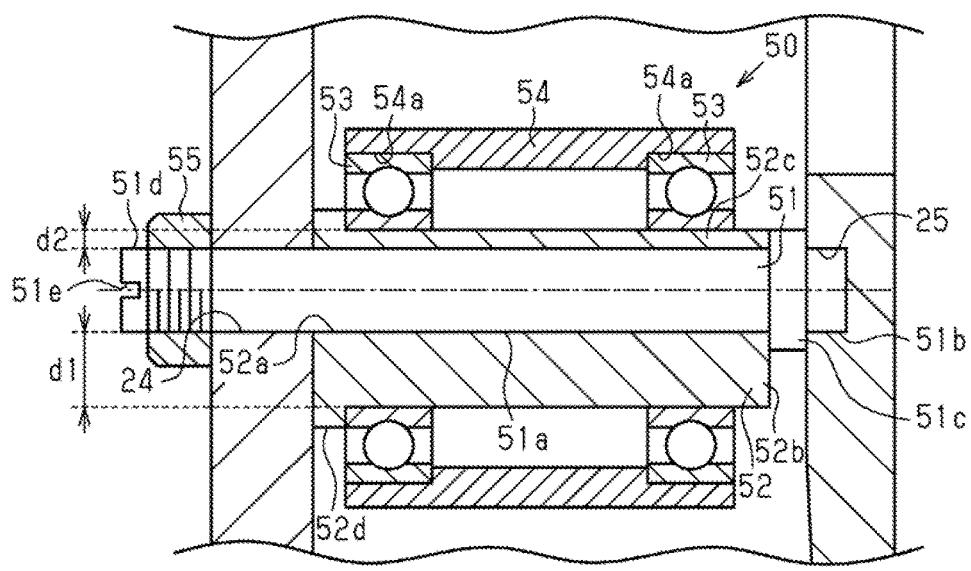
FIG. 3 is a diagram schematically illustrating a structure of a belt tension adjusting mechanism included in the steering system according to this embodiment.

As illustrated in FIG. 3, the adjusting shaft 51 includes a shaft portion 51a. The shaft portion 51a includes a first end (i.e., the left end of the shaft portion 51a in FIG. 3) and a second end (i.e., the right end of the shaft portion 51a in FIG. 3). The second end of the shaft portion 51a is provided with a fitted portion 51b fitted to the fitting hole 25. The shaft portion 51a is provided with a flange 51c adjacent to the fitted portion 51b. The outer diameter of the flange 51c is larger than the outer diameter of the shaft portion 51a. The first end of the shaft portion 51a (i.e., the left end of the shaft portion 51a in FIG. 3) is provided on its outer peripheral surface with a thread portion 51d. The length of the adjusting shaft 51 is set such that the thread portion 51d (or the first end of the shaft portion 51a) is exposed to the outside of the speed reducer casing 17 through the through hole 24 when the fitted portion 51b of the adjusting shaft 51 is fitted to the fitting hole 25 and the first rack housing member 16a and the second rack housing member 16b are combined with each other. The outer diameter of the shaft portion 51a is slightly smaller than the inner diameter of the through hole 24. The adjusting shaft 51 is fitted to the through hole 24 via a seal (not illustrated) to prevent intrusion of foreign matter. A lock nut 55 is screwed to the thread portion 51d, thus fixing the adjusting shaft 51 to the speed reducer casing 17 (or more specifically, the first rack housing member 16a). The first end of the shaft portion 51a (i.e., the left end of the shaft portion 51a in FIG. 3) is provided at its end face with an irregular-shaped hole 51e. Insertion of a tool into the irregular-shaped hole 51e enables rotation of the adjusting shaft 51.

The eccentric shaft 52 is a cylindrical body whose center of rotation is deviated from (or eccentric relative to) its central axis. The eccentric shaft 52 is provided in its center of rotation with a hollow portion 52a axially passing through the eccentric shaft 52. The inner diameter of the hollow portion 52a is slightly smaller than the outer diameter of the shaft portion 51a of the adjusting shaft 51. The shaft portion 51a of the adjusting shaft 51 is fitted into the hollow portion 52a of the eccentric shaft 52, with the shaft portion 51a passing through the hollow portion 52a. The adjusting shaft 51 is press-fitted to the hollow portion 52a of the eccentric shaft 52 until the flange 51e abuts against the end face of a second end of the eccentric shaft 52. The adjusting shaft 51 and the eccentric shaft 52 are rotatable together. Referring to FIG. 3, the radial length of a thick portion 52b of the eccentric shaft 52 that is the thickest portion thereof is denoted by "d1", and the radial length of a thin portion 52c of the eccentric shaft 52 that is the thinnest portion thereof is denoted by "d2". A first end of the eccentric shaft 52 (i.e., the left end of the eccentric shaft 52 in FIG. 3) is provided on its outer peripheral surface with a flange 52d.

The axial ends of the tension pulley 54 (i.e., first and second ends of the tension pulley 54) are provided on their inner peripheral surfaces with fitted portions 54a fitted to the bearings 53. The inner diameter of each fitted portion 54a is larger than the inner diameter of a portion of the tension pulley 54 other than the fitted portions 54a. The axial length of each fitted portion 54a is substantially similar to the axial length of each bearing 53.

The tension pulley 54 is disposed around the outer periphery of the eccentric shaft 52, with each bearing 53 (or more specifically, an outer ring of each bearing 53) fitted to an associated one of the two fitted portions 54a. Inner rings of the two bearings 53 are press-fitted to the outer peripheral surface of the eccentric shaft 52. Thus, the inner rings of the bearings 53 are fixed to the adjusting shaft 51 and the eccentric shaft 52 so as to be rotatable together with the adjusting shaft 51 and the eccentric shaft 52. A first bearing 53 is located adjacent to the first end of the eccentric shaft 52. The inner ring of the first bearing 53 is in abutment with the flange 52d. A second bearing 53 is located adjacent to the second end of the eccentric shaft 52. The tension pulley 54 rotates with respect to the eccentric shaft 52 via the first and second bearings 53. Screwing the lock nut 55 to the thread portion 51d fixes the adjusting shaft 51 to the speed reducer casing 17.

Figure 4A:
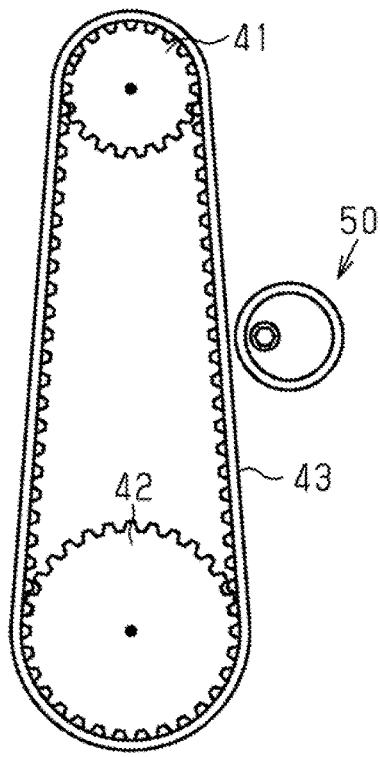
FIG. 4A is a diagram schematically illustrating engagement of a driving pulley and a driven pulley with a belt when the belt tension adjusting mechanism is used.

When the tension pulley 54 is not pressed against a portion of the belt 43 between the driving pulley 41 and the driven pulley 42 as illustrated in FIG. 4A, the belt 43 has tension based on the relative positions of the driving pulley 41 and the driven pulley 42 and the length of the belt 43. When the tension pulley 54 is not pressed against the belt 43, the thin portion 52c of the eccentric shaft 52, for example, faces the belt 43. In the case illustrated in FIG. 4A, the tension pulley 54 is farthest away from the belt 43.

Figure 4B:
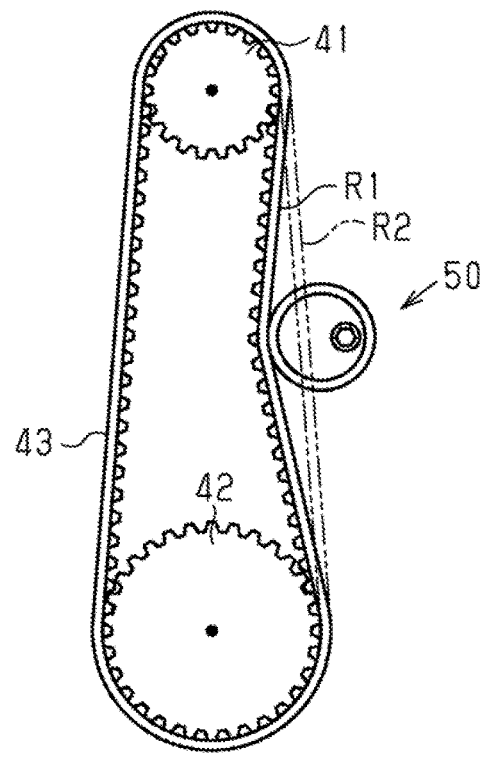
FIG. 4B is a diagram schematically illustrating engagement of the driving pulley and the driven pulley with the belt when the belt tension adjusting mechanism is used.

When the tension pulley 54 is rotated and thus pressed against the portion of the belt 43 between the driving pulley 41 and the driven pulley 42 as illustrated in FIG. 4B, the tension of the belt 43 is greater than the tension of the belt 43 illustrated in FIG. 4A. Because the tension pulley 54 is pressed against the belt 43, a route R1 for the belt 43 indicated by the continuous lines in FIG. 4B is longer than a route R2 for the belt 43 indicated by the dashed lines. The route R1 and the route R2 are paths the belt 43 follows. The tension of the belt 43 that follows the route R1 is greater than the tension of the belt 43 that follows the route R2 by a difference in length between the route R1 and the route R2 (i.e., a difference in length of the belt 43). When the tension pulley 54 is pressed against the belt 43, the thick portion 52b of the eccentric shaft 52, for example, faces the belt 43. In the case illustrated in FIG. 4B, the tension pulley 54 is closest to the line connecting the center of the driving pulley 41 and the center of the driven pulley 42.

The driving pulley 41 is in engagement with the belt 43 to a predetermined extent in the circumferential direction of the driving pulley 41. The driven pulley 42 is in engagement with the belt 43 to a predetermined extent in the circumferential direction of the driven pulley 42. In FIG. 4B, the tension pulley 54 is pressed against the portion of the belt 43 between the driving pulley 41 and the driven pulley 42. Thus, the extent of engagement of the driving pulley 41 with the belt 43 illustrated in FIG. 4B is larger than the extent of engagement of the driving pulley 41 with the belt 43 illustrated in FIG. 4A, and the extent of engagement of the driven pulley 42 with the belt 43 illustrated in FIG. 4B is larger than the extent of engagement of the driven pulley 42 with the belt 43 illustrated in FIG. 4A.

Providing a steering system including a conventional belt tension adjusting mechanism inevitably involves: assembling components, such as a nut, a driving pulley, a driven pulley, and a belt, to a second rack housing member; adjusting the tension of the belt by the belt tension adjusting mechanism; and then assembling a first rack housing member and the second rack housing member to each other. Such a procedure requires attaching the driving pulley and a motor to the second rack housing member.

This embodiment, however, enables a procedure involving: assembling the first rack housing member 16a and the second rack housing member 16b to each other; positioning, via the bearing 44, the extremity (i.e., the first end) of the rotary shaft 21 of the motor 20, with the driving pulley 41 attached thereto, with respect to the first rack housing member 16a; and then adjusting the tension of the belt 43 by the belt tension adjusting mechanism 50. Thus, the tension of the belt 43 is adjusted accurately.

Figure 5:
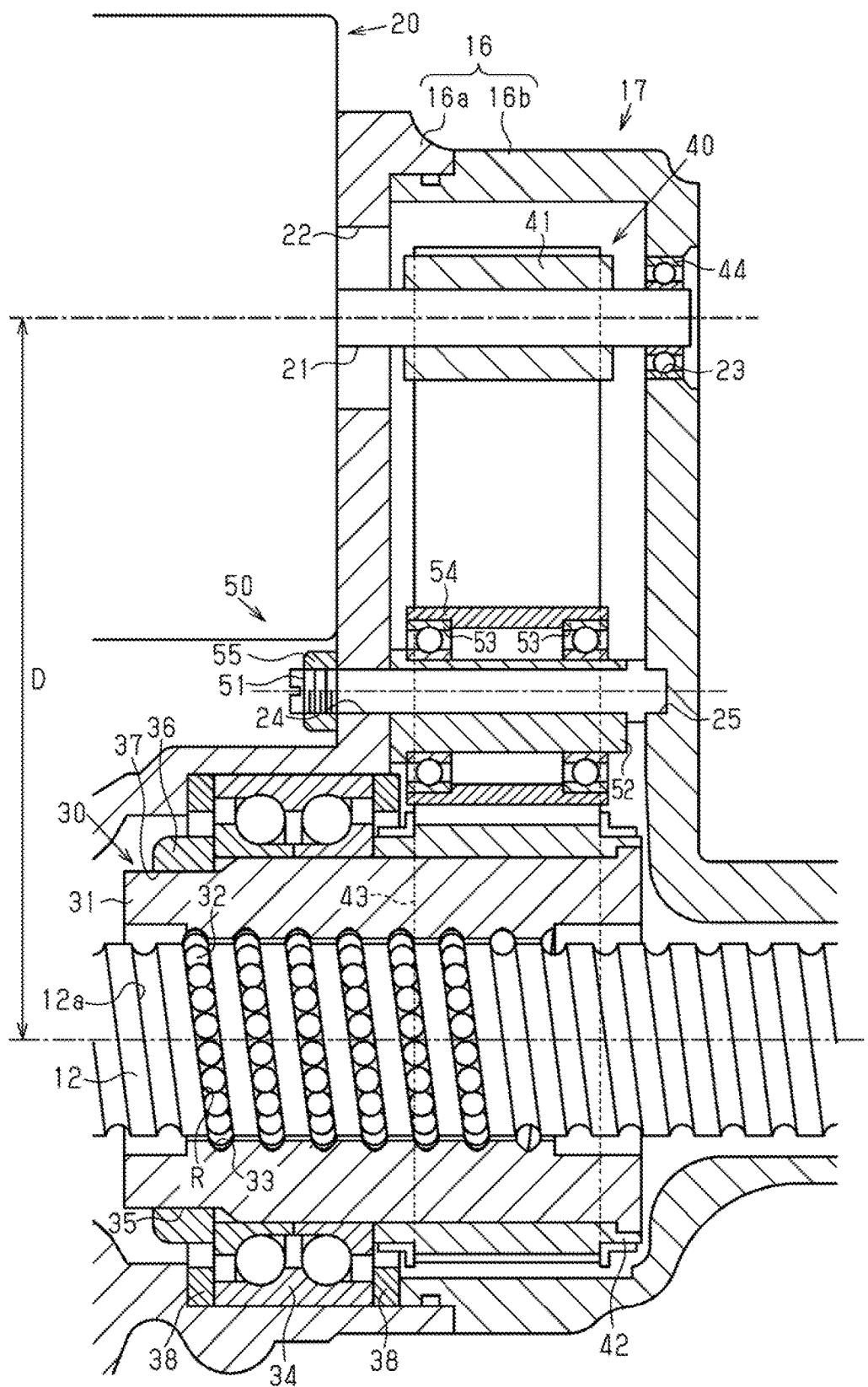
FIG. 5 is a cross-sectional view schematically illustrating the assisting mechanism included in the steering system according to this embodiment, with the location of a motor changed.

The distance between the central axis of the rotary shaft 21 of the motor 20 and the central axis of the rack shaft 12 will be referred to as an "inter-shaft distance D". When an increase in the inter-shaft distance D presents no problem, the first rack housing member 16a may be provided with the through hole 22 and the through hole 24, the second rack housing member 16b is provided with the through hole 23, and the motor 20 is assembled to the first rack housing member 16a, as illustrated in FIG. 5, for example. Thus, the tension of the belt 43 may be adjusted after the first rack housing member 16a and the second rack housing member 16b are assembled to each other. The assembly procedure in this example involves: assembling the nut 31, the driving pulley 41, the driven pulley 42, the belt 43, and the belt tension adjusting mechanism 50 to the first rack housing member 16a; assembling the first rack housing member 16a and the second rack housing member 16b to each other; and then adjusting the tension of the belt 43 by the belt tension adjusting mechanism 50. This makes it possible to make a selection between attaching the motor 20 to the first rack housing member 16a and attaching the motor 20 to the second rack housing member 16b. Consequently, the flexibility of location of the motor 20 increases.

Adjusting the tension of the belt 43 after the first rack housing member 16a and the second rack housing member 16b are assembled to each other involves rotating the adjusting shaft 51 from outside the rack housing 16, with the lock nut 55 loosened. This changes the distance between the portion of the tension pulley 54 to be pressed against the belt 43 and the eccentric shaft 52 being a axis of rotation of the tension pulley 54. In other words, the rotation of the adjusting shaft 51 changes the degree of pressing of the tension pulley 54 against the belt 43. Thus, the rotation of the adjusting shaft 51 enables adjustment of the tension of the belt 43. The lock nut 55 is then tightened again so as to maintain the tension of the belt 43 at the adjusted level.

The effects of this embodiment will be described below.

(1) The arrangement illustrated in FIG. 2 enables adjustment of the tension of the belt 43 by rotating the adjusting shaft 51 from outside the rack housing 16. Thus, this arrangement enables the procedure involving assembling the first rack housing member 16a and the second rack housing member 16b to each other, and then adjusting the tension of the belt 43 by the belt tension adjusting mechanism 50. The arrangement illustrated in FIG. 5 also enables the procedure involving assembling the first rack housing member 16a and the second rack housing member 16b to each other, and then adjusting the tension of the belt 43 by the belt tension adjusting mechanism 50. Consequently, this embodiment makes it possible to make a selection between attaching the motor 20 to the first rack housing member 16a and attaching the motor 20 to the second rack housing member 16b. This advantage increases the flexibility of location of the motor 20. This advantage also offers a higher degree of flexibility in installing the EPS 1 on a vehicle.

(2) Rotating the adjusting shaft 51 from outside the rack housing 16 enables adjustment of the tension of the belt 43. Thus, if the assembly of the rack housing 16 is completed, appropriately rotating the adjusting shaft 51 would adjust the tension of the belt 43 in one adjusting operation.

(3) The arrangement illustrated in FIG. 2 is such that the wall surface of the rack housing 16 from which the adjusting shaft 51 is exposed is different from the wall surface of the rack housing 16 to which the motor 20 is fixed. The wall surface of the rack housing 16 from which the adjusting shaft 51 is exposed is the wall surface of the first rack housing member 16a. The wall surface of the rack housing 16 to which the motor 20 is fixed is the wall surface of the second rack housing member 16b.

As a comparative example illustrated in FIG. 5, the first rack housing member 16a is provided with the through hole 22 and the through hole 24. This arrangement makes it necessary to separate the motor 20 and the adjusting shaft 51 from each other so as to prevent the motor 20 and the adjusting shaft 51 from interfering with each other. Such a necessity results in an increase in the inter-shaft distance D between the central axis of the rotary shaft 21 of the motor 20 and the central axis of the rack shaft 12.

According to the embodiment, the through hole 22 and the through hole 24 are provided in the different wall surfaces of the speed reducer casing 17. This arrangement prevents the motor 20 and the adjusting shaft 51 from interfering with each other, thus allowing the motor 20 to be located closer to the rack shaft 12. This results in a reduction in the inter-shaft distance D. Such a reduction in the inter-shaft distance D reduces the size (or in particular, the radial size) of the rack housing 16. Consequently, the EPS 1 is reduced in size, allowing the EPS 1 incorporating the belt tension adjusting mechanism 50 to be installed on a vehicle with more flexibility.

(4) A known technique to assemble a rack housing involves assembling components, such as a nut, a driving pulley, a driven pulley, a belt, and a belt tension adjusting mechanism, only to a second rack housing member, thus supporting the rotary shaft of a motor in a cantilever manner. This is because the known technique makes it necessary to finish adjustment of the tension of the belt before the assembly of the rack housing.

The assembly of the rack housing 16 in this embodiment, however, may involve assembling components, such as the nut 31, the driving pulley 41, the driven pulley 42, the belt 43, and the belt tension adjusting mechanism 50, to either of the first rack housing member 16a and the second rack housing member 16b. This is because this embodiment enables the tension of the belt 43 to be adjusted by the adjusting shaft 51 after assembling the rack housing 16. In one example, the assembly of the rack housing 16 may involve assembling the motor 20 and the driving pulley 41 to the first rack housing member 16a, and assembling the nut 31, the driven pulley 42, and the belt tension adjusting mechanism 50 to the second rack housing member 16b. This means that this embodiment increases the flexibility of location of the components to be housed in the rack housing 16 in assembling the rack housing 16. For example, the first end of the rotary shaft 21 of the motor 20 is supported by the bearing 44 fitted into the through hole 23 in the first rack housing member 16a, and the second end of the rotary shaft 21 of the motor 20 is supported by the second rack housing member 16b by fixation of the motor 20 to the second rack housing member 16b. Thus, the first and second ends of the rotary shaft 21 of the motor 20 are both supported. The number of locations where the rotary shaft 21 is supported in this arrangement is larger than the number of locations where the rotary shaft is supported in the conventional arrangement. Consequently, if sliding resistance generated between the belt 43 and the rotary shaft 21 (or the driving pulley 41) causes the rotary shaft 21 to vibrate, the arrangement of this embodiment would reduce the vibrations of the rotary shaft 21.

(5) With the first end of the adjusting shaft exposed to the outside of the rack housing 16, the first end of the adjusting shaft 51 is fitted to the through hole 24, and the second end of the adjusting shaft 51 is fitted to the fitting hole 25. The adjusting shaft 51 is supported by both of the wall surfaces of the speed reducer casing 17 axially opposite to each other. Thus, if sliding resistance generated between the belt 43 and the tension pulley 54, for example, causes the adjusting shaft 51 to vibrate, the arrangement of this embodiment would reduce the vibrations of the adjusting shaft 51.

This embodiment may be modified as described below. Although the adjusting shaft 51 is provided with the irregular-shaped hole 51e in this embodiment, the adjusting shaft 51 may be provided with any other suitable fitting portion. In one example, the adjusting shaft 51 may be provided with an irregular-shaped protrusion protruding from an end face of the second end of the adjusting shaft 51. In other words, the adjusting shaft 51 may be provided with any fitting portion to which a tool for rotating the adjusting shaft 51 is to be fitted. When a tool for rotating the adjusting shaft 51 using friction, for example, is used, the adjusting shaft 51 does not have to be provided with a fitting portion, such as the irregular-shaped hole 51e.

Although the adjusting shaft 51 is fitted to the through hole 24 via a seal in this embodiment, the adjusting shaft 51 may be directly fitted to the through hole 24. In this embodiment, the shaft portion 51a of the adjusting shaft 51 is press-fitted to the hollow portion 52a of the eccentric shaft 52, so that the adjusting shaft 51 and the eccentric shaft 52 are fixed to each other so as to be rotatable together. The adjusting shaft 51 and the eccentric shaft 52, however, may be fixed to each other in any other suitable manner. In one example, a setscrew may be used to fix the adjusting shaft 51 and the eccentric shaft 52 to each other such that the adjusting shaft 51 and the eccentric shaft 52 are rotatable together. In other words, the adjusting shaft 51 and the eccentric shaft 52 may be fixed to each other in any manner that enables the adjusting shaft 51 and the eccentric shaft 52 to rotate together. The eccentric shaft 52, the bearings 53, and the tension pulley 54 may also be fixed to each other in any suitable manner.

The adjusting shaft 51 and the eccentric shaft 52 are separate components in this embodiment. Alternatively, the adjusting shaft 51 and the eccentric shaft 52 may be integral with each other. Specifically, the adjusting shaft 51 and the eccentric shaft 52 may be a single-piece tension adjustment shaft.

This embodiment implements the EPS 1 configured to provide an assisting force to the rack shaft 12 by the motor 20 including the rotary shaft 21 disposed in parallel with the rack shaft 12. The steering system according to the invention, however, is not limited to this configuration. The steering system according to the invention may be any steering system that includes the ball screw mechanism 30. Although the exemplary electric power steering system is configured to utilize the torque of the motor 20 so as to assist linear motion of the rack shaft 12 produced in conjunction with a steering operation, the invention may be applied to a steer-by-wire (SBW) system. A steer-by-wire system implemented by the invention may be not only a front wheel steering system but also a rear wheel steering system or a four wheel steering system (4WS).

What is claimed is:

1. A steering system comprising:
 a motor;
 a steered shaft including a thread groove, the steered shaft being configured to reciprocate in an axial direction of the steered shaft;
 a ball screw mechanism including a cylindrical nut screwed to the thread groove via a plurality of balls, the ball screw mechanism being configured to provide an axial force to the steered shaft in accordance with rotation of the nut;
 a speed reducer including
  a driven pulley fixed to an outer peripheral surface of the nut disposed inward of the driven pulley,
  a driving pulley fixed to a rotary shaft of the motor so as to be rotatable together with the rotary shaft, and
  a belt wound around the driven pulley and the driving pulley;
 a belt tension adjusting mechanism to adjust a tension of the belt; and
 a housing which houses the steered shaft, the ball screw mechanism, the speed reducer, and the belt tension adjusting mechanism, wherein
  the housing includes a first housing member and a second housing member aligned in the axial direction,
  portions of the first and second housing members mating with each other and protruding in a direction perpendicular to the axial direction constitute a speed reducer casing which houses a portion of the speed reducer,
  the speed reducer casing is provided in its outer wall with a through hole passing through the outer wall in the axial direction,
  the belt tension adjusting mechanism includes
   a tension adjustment shaft, and
   a tension pulley rotatably disposed around an outer peripheral surface of the tension adjustment shaft, the tension pulley being configured to abut against the belt,
  the tension adjustment shaft includes
   a first end protruding out of the housing through the through hole,
   a second end housed in the housing, the second end being coaxial with the first end, and
   an eccentric cylindrical portion eccentric relative to a central axis of the first and second ends, the eccentric cylindrical portion being disposed between the first and second ends, and
  the tension adjustment shaft is configured to rotate around the central axis of the first and second ends.

2. The steering system according to claim 1, wherein the tension adjustment shaft includes
 an adjusting shaft protruding out of the housing through the through hole, and
 the eccentric cylindrical portion having cylindrical shape and including an eccentric hollow portion, and the eccentric cylindrical portion is fixed to the adjusting shaft, with the adjusting shaft passing through the hollow portion.

3. The steering system according to claim 1, wherein the speed reducer casing includes a wall surface opposite to the through hole in the axial direction,
the wall surface is provided with a fitting hole, and
the second end of the tension adjustment shaft is fitted to the fitting hole.

4. The steering system according to claim 1, wherein a portion of the tension adjustment shaft protruding out of the housing through the through hole is provided with a fitting portion.

5. The steering system according to claim 1, wherein the through hole is disposed in a wall of the speed reducer casing defining a portion of the first housing member,
a first hole is disposed in a wall of the speed reducer casing defining a portion of the second housing member,
the rotary shaft of the motor is disposed into the housing through the first hole, and
the motor is attached to the second housing member.

6. The steering system according to claim 5, wherein
a second hole is disposed in the wall of the speed reducer casing defining a portion of the first housing member, the second hole being located opposite to the first hole in the axial direction, and
an extremity of the rotary shaft of the motor is fitted to the second hole via a bearing and is thus rotatably supported by the first housing member.

7. The steering system according to claim 1, wherein
the nut, the driving pulley, the driven pulley, and the belt tension adjusting mechanism are assembled to the housing, with each of the nut, the driving pulley, the driven pulley, and the belt tension adjusting mechanism being respectively fixed to either of the first housing member and the second housing member.

* * * * *